E. NOEL.
FRONT WHEEL DRIVE FOR AUTOMOBILES.
APPLICATION FILED FEB. 23, 1917.
1,324,062.
Patented Dec. 9, 1919.
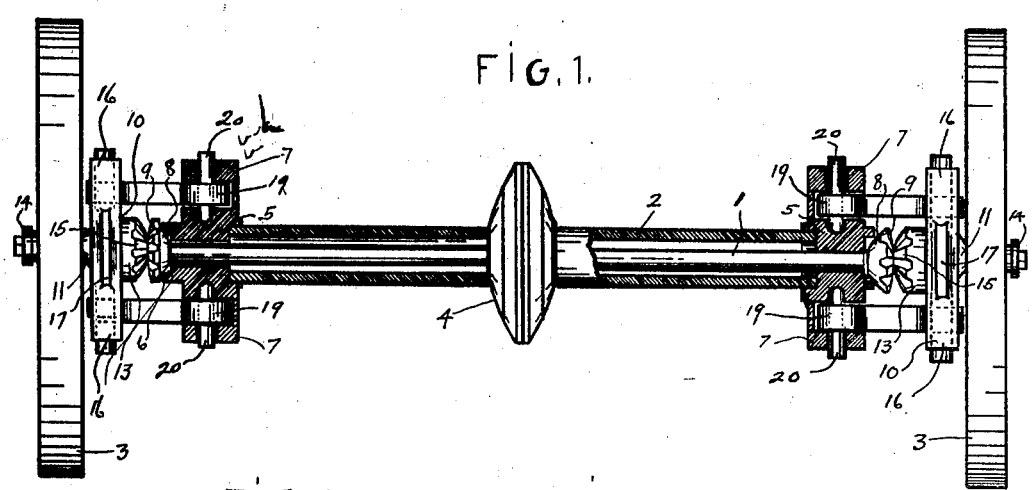
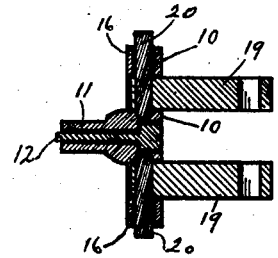
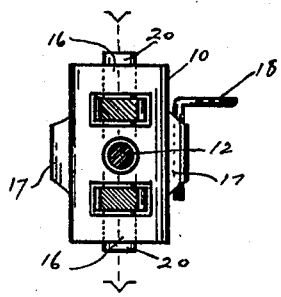
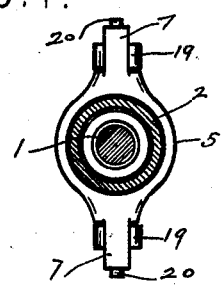
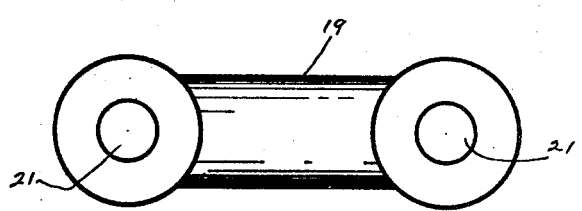
WITNESS:
INVENTOR.
ELI NOEL.
BY
M. C. Gillham
ATTORNEY.

UNITED STATES PATENT OFFICE.

ELI NOEL, OF KANSAS CITY, MISSOURI.

FRONT-WHEEL DRIVE FOR AUTOMOBILES.

1,324,062.	Specification of Letters Patent.	Patented Dec. 9, 1919.

Application filed February 23, 1917. Serial No. 150,577.

*To all whom it may concern:*

Be it known that I, ELI NOEL, a citizen of the United States, and residing at Kansas City, in the county of Jackson and State of Missouri, have invented a new and useful Front-Wheel Drive for Automobiles, of which the following is a specification.

My invention relates to improvements in front wheel drives for automobiles in which gear wheels provided with radial convex cogs operate in conjunction with a power driven front shaft or axle to turn the wheels and permit their deflection from a straight direction to steer the automobile; and the objects of my invention are, first, to provide a journal box for the power driven axle with facilities for bridging the gear wheels having radial convex cogs to transfer the load to the wheels; second; to provide a journal box for the stub shafts with facilities for supporting the wheels and for operating in conjunction with the above-named journal boxes to carry the load and, third, to provide pivoted bridging members between the journal boxes to afford facility for operating the gear wheels with radial convex cogs at different angles of operative engagement.

I attain these objects by the mechanism illustrated in the accompanying drawing, in which—

Figure 1, is a vertical view of the front wheels of an automobile, partly sectioned, and showing my invention applied thereto; Fig. 2, is a vertical section through the journal box on the stub shaft, on the line V—V, in Fig. 3, and showing the extension thereon for mounting the wheel; Fig. 3, is a view of the inner side of the journal box on the stub shaft, the bridging members and the stub shaft being shown in cross-section; Fig. 4, is a view of the inner side of the journal box on the driving axle or shaft, the axle and axle housing being shown in cross-section, and Fig. 5, is a plan view of the pivoted bridging member.

Similar reference numerals refer to corresponding parts throughout the several views.

Referring to the drawings—1 is the revoluble axle or shaft, 2, the axle housing, 3, the wheels, and 4, the differential gear housing, containing the power receiving and power imparting devices, not shown, constituting the front wheel drive of an automobile. Journal boxes 5, are mounted on the axle housing 3, and adapted to receive the driving axle or shaft 1. Gear housings 6, are formed integral with the outer side of the journal boxes and are adapted to receive and house a portion of a gear wheel, hereinafter described. Pivot supports 7, are formed integral with the upper and lower ends of the journal boxes 5. Gear wheels 8, provided with radial cogs 9, are mounted on the opposite end portions of the driven shaft 1, outwardly of the journal boxes 5. Journal boxes 10, are provided integrally with outwardly projecting housings 11, which are adapted to enter the hubs of the wheels and permit them to turn thereon. Revoluble stub shafts 12, are journaled in the boxes 10, their outer end portions being formed square and fitted in a disk, not shown, provided with cogs, not shown, which are engaged by similar cogs, not shown, formed on the ends of the hubs, not shown, whereby the wheels are forced to turn, in the well known manner. Gear wheels 13, are mounted on the inner ends of the shafts 12, and are provided with radial convex cogs 15, which describe, in contour, a radius a little shorter than the radius described by the contour of the radial convex cogs on the gear wheels 8, which cogs 9 and 15, are adapted to operatively engage each other at any angle at which the gear wheels 13, are presented to the gear wheels 8. Caps 14, are screwed on the outer ends of the hubs of the wheels to exclude dirt and foreign substances from the bearings. Pivot supports 16, are formed integral with the upper and lower ends of the journal boxes 10, in opposition to the pivot supports 7, on the journal boxes 5. Ears 17, are formed on the front and rear sides of the journal boxes 10, and are adapted to receive steering rigging devices adapted for steering the wheels, such as arms levers and the like, and as shown at 18, in Fig. 3. Bridging members 19, are pivotally connected between the pivot supports 7 and 16, and thereby hingedly and rotatably connecting the journal boxes 10, with journal boxes 5. Pivot pins 20, are extended vertically through the pivot supports and are respectively seated in the adjacent journal box. The pivot pins 20, are located at definitely ascertained points of support, and which are determined by the radius of the cogs on the gear wheels 8 and 13. In this instance the gear wheels shown have cogs describing unequal radiuses, the radius of the gear wheels 13, being less than the radius of the gear wheels 8, and, therefore, the bridge members 19, are pivoted on the journal boxes 10, at a point outwardly of the gear wheels 5, a distance identical with the radius of the latter, and on the journal boxes 13, at a point inwardly of the gear wheels 8, a distance identical with the radius of the same. The above described method of pivoting the bridge members affords facility for the gear wheels 13, to move about the gear wheels 8, with accuracy and with a minimum of friction, the independent turning movement of the gear wheels 13, on the pivot pins on the journal boxes 10, assures the proper adjustment of the gear wheels to drive and steer the wheels 3. The pivot pins are, preferably, rigid, the bridge members 19, being provided with pivot holes 21, which are adapted to permit the bridge members to turn thereon with a little freedom.

The construction and assembly of the parts as herein-above described affords facility for simultaneously driving and steering the front wheels of automobiles, and thereby obtain the advantage incident to the tractive effort of four wheels, among which advantages, many make for economy and safety.

It is understood that while I show and describe gear wheels with cogs of unequal radius, gear wheels having convex teeth of equal radiuses may be used, without departing from my invention or the scope of the appended claim.

Having described my invention what I claim is—

In a front wheel drive for automobiles, the combination with the universal joint having gears provided with convexed cogs, of a rigid bearing box supporting the driving gear shaft, a mobile bearing box supporting the shaft of the driven gear, a bar coupling loosely mounted on pivots disposed vertically in the upper portions of said bearing boxes, and a bar coupling loosely mounted on pivots disposed vertically in the lower portions of said bearing boxes and paralleling said first mentioned bar coupling.

ELI NOEL.

Witnesses:
BATTLE McCARDLE,
ELIAS BERELL.